(12) United States Patent
Montineri

(10) Patent No.: US 6,305,488 B1
(45) Date of Patent: Oct. 23, 2001

(54) MOTOR VEHICLE WITH BOOM LIFT AND IMPROVED POWER TRANSFER DEVICE

(75) Inventor: Giampaolo Montineri, Perugia (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/444,133

(22) Filed: Nov. 20, 1999

(30) Foreign Application Priority Data

Nov. 20, 1998 (IT) .............................................. BO98A0646

(51) Int. Cl.[7] .................................................. B60K 17/00
(52) U.S. Cl. ............................................. 180/374; 180/375
(58) Field of Search .................................. 180/374, 375, 180/291, 292, 89.12

(56) References Cited

U.S. PATENT DOCUMENTS

| | | | |
|---|---|---|---|
| 2,477,252 | * 6/1949 | Hutchings | 180/1.5 |
| 2,978,054 | * 4/1961 | Kraus | 180/70 |
| 4,353,429 | * 10/1982 | Herron | 180/70 |
| 5,188,193 | * 2/1993 | Schroeder | 180/242 |
| 5,687,809 | * 11/1997 | Braud | 180/297 |
| 5,931,255 | * 8/1999 | Sewell | 180/374 |

* cited by examiner

*Primary Examiner*—Lanna Mai
*Assistant Examiner*—Christopher Buchanan
(74) *Attorney, Agent, or Firm*—Larry W. Miller; John William Stader

(57) ABSTRACT

A motor vehicle is provided with a cab, an engine located laterally with respect to the cab, an engine transmission operatively connected to the engine, and a telescopic lift arm which, in a front working position, is located between the cab and the propulsion mechanism. The front and rear axles receive motive power from a pair of propeller shafts. A power transfer device of a substantially rectilinear shape is provided between the engine transmission and the pair of propeller shafts. The power transfer device is defined entirely by a number of gears.

3 Claims, 5 Drawing Sheets

MOTOR VEHICLE WITH BOOM LIFT AND IMPROVED POWER TRANSFER DEVICE

BACKGROUND OF THE INVENTION

The present invention relates to a motor vehicle with a telescopic lift arm and, particularly to motor vehicles in which the telescopic lift arm, when operated at the front of the vehicle, is below the line of sight of the driver of the vehicle. Conventionally, such a lowered position corresponds to an all-round visibility of the driver in the cab.

As is known, to be able to lower the telescopic lift arm without restricting the line of sight of the driver, solutions have been adopted in which the vehicle engine is located on a first longitudinal side of the vehicle while the cab is located on a second longitudinal side, opposite to the first. The lift arm is lowered into a central recess formed in the vehicle body between the cab and the engine. The hydraulic assembly powering the telescopic arm is normally located at the rear of the vehicle. It will be appreciated that the central position of the telescopic arm and the hydraulic assembly powering the arm provides for a perfect load balance when operating the arm.

One of the problems posed by this type of vehicle is that the engine positioned on the lateral side of the cab must, for construction reasons, be located higher than the propeller shafts transmitting motion to the front and rear axles. With respect to the ground, the engine in fact is located at substantially the same height as the driver's cab, while the propeller shafts are traditionally located beneath the level of the cab. The main reason for this kind of arrangement lies in the fact that the engine and the device for transmitting motion from the engine to the universal joints of the propeller shafts having to be located substantially higher than the two propeller shafts to avoid being damaged when traveling over rough ground.

The above arrangement therefore poses the problem of providing a reliable system for transmitting motion between shafts—the output drive shaft of the engine and the propeller shafts—located at two different heights with respect to the ground. In addition, such a transmission system must also be located substantially beneath the recess in the vehicle body for receiving the telescopic arm in the lowered position.

One attempt to solve the above problem is described in U.S. Pat. No. 5,478,192, in which a motor vehicle is discussed having a telescopic lift arm, and wherein the cab and engine are located conventionally on opposite sides of the longitudinal axis of symmetry of the vehicle. A system for transmitting motion between the drive shaft coming out of the engine transmission and the propeller shafts is provided comprising two chains arranged in series. An inherent problem of such an arrangement is the creation of vibrations during drive transmission, and a poor reliability of the system as a whole. Moreover, in as much as the motion transfer case containing the chains sits on top of the engine transmission, the resultant overall length of the combined engine/transmission structure necessitates to spread the front and rear axles strongly apart, which badly influences the maneuverability of the vehicle.

Moreover, to get under the side member of the vehicle, the above system calls for dividing the motion transfer case into two chain housings inclined at an angle with respect to each other.

SUMMARY OF THE INVENTION

It is, therefore, an object of the present invention to provide a motor vehicle having a telescopic lift arm and which is designed to eliminate the aforementioned drawbacks.

It is another object of this invention to provide in a motorized vehicle, between the engine transmission and a pair of propeller shafts, a power transfer device of a substantially rectilinear shape.

These and other objects, features and advantages are accomplished according to the instant invention in which a motor vehicle is provided with a cab, an engine located laterally with respect to the cab, an engine transmission operatively connected to the engine, and a telescopic lift arm which, in a front working position, is located between the cab and the propulsion mechanism. The front and rear axles receive motive power from a pair of propeller shafts. A power transfer device of a substantially rectilinear shape is provided between the engine transmission and the pair of propeller shafts. The power transfer device is defined entirely by a number of gears.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
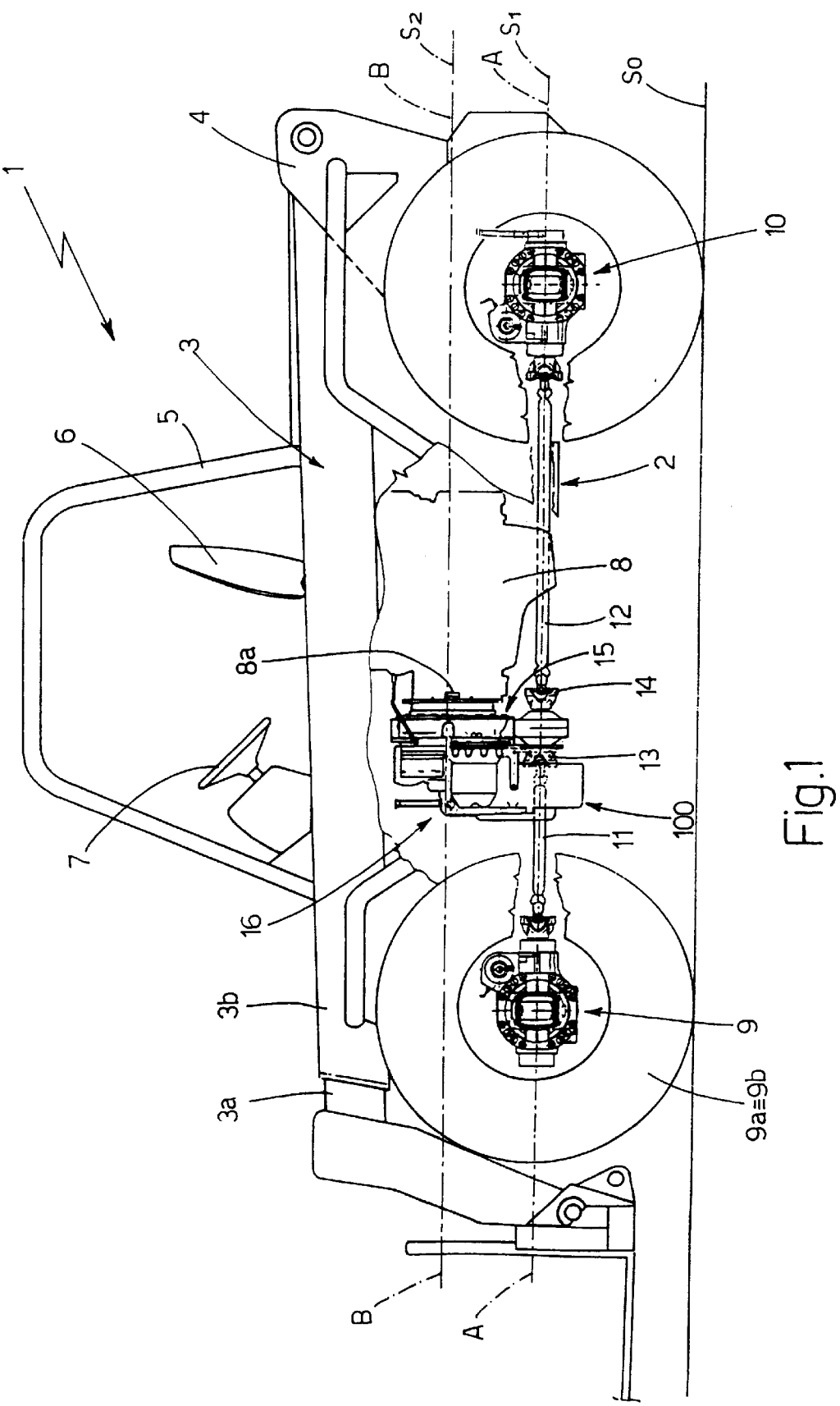
FIG. 1 is a side elevational view, with some parts removed, of a motor vehicle having a telescopic lift arm.

A motor vehicle 1 with a telescopic lift arm 3, incorporating the principles of the instant invention can be seen in FIG. 1. Any left and right references are used as a matter of convenience and are determined by standing at the rear of the machine 1, facing forward into the direction of travel.

Vehicle 1 includes a body 2 supported by a frame capable of supporting the weight of an arm 3, which comprises two telescopic portions 3a, 3b and is powered by a hydraulic drive assembly 4 located at the rear of the vehicle 1.

Figure 2:
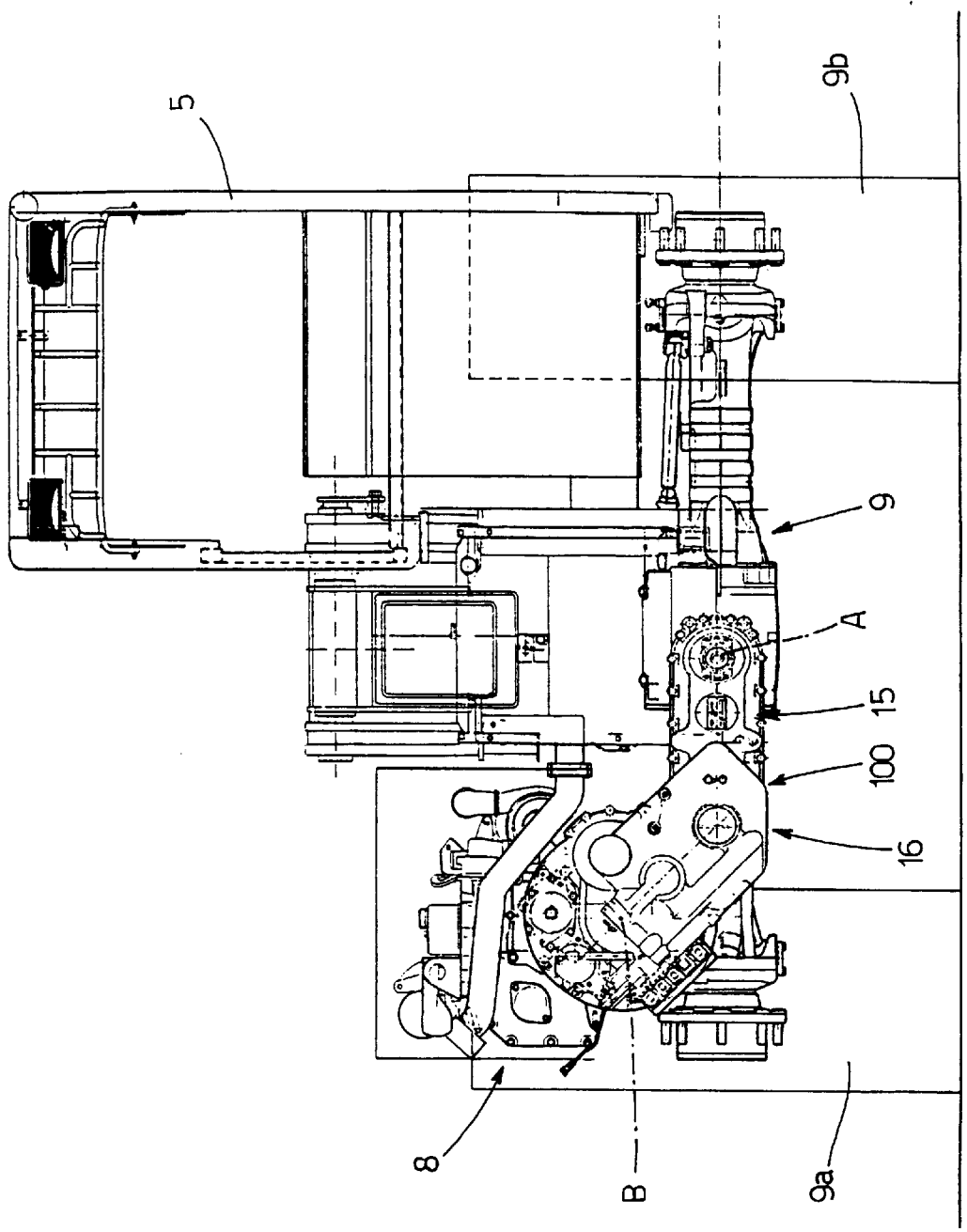
FIG. 2 shows a cross section of the motor vehicle of FIG. 1.
Figure 3:
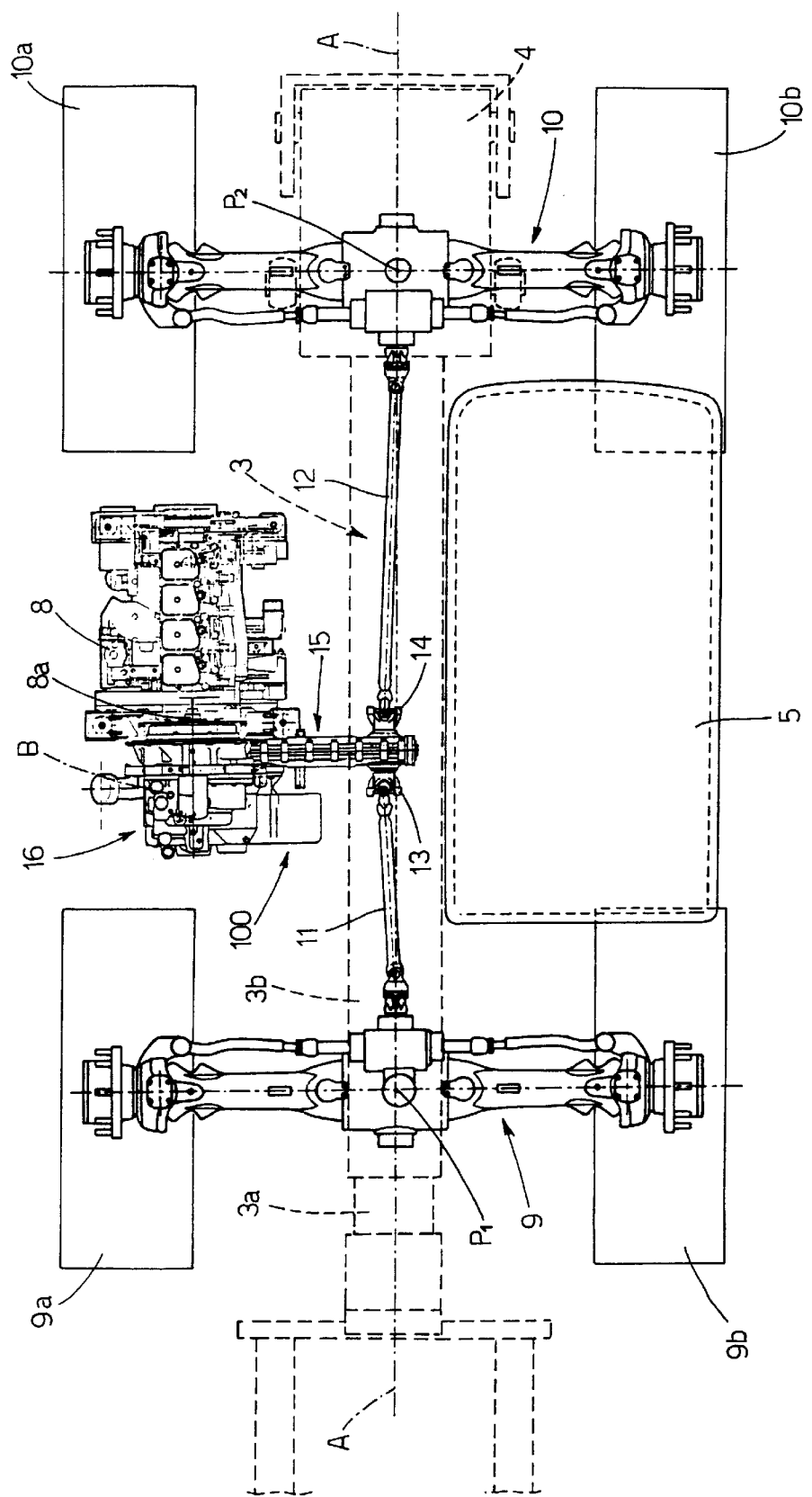
FIG. 3 shows a plan view of the motor vehicle of FIGS. 1 and 2 illustrating the location of the engine with respect to the front and rear propeller shafts.

Vehicle 1 also includes a cab 5 housing a driver's seat 6 and a steering wheel 7. As shown more clearly in FIGS. 2 and 3, cab 5 is mounted laterally with respect to a longitudinal axis of symmetry A of vehicle 1 extending through center-line points P1 and P2 of respective axles 9 and 10 (FIG. 3). An engine 8 is mounted on the other side of longitudinal axis of symmetry A for simultaneously powering front axle 9 and rear axle 10 via a transmission defined respectively by a front propeller shaft 11 and a rear propeller shaft 12 (FIG. 3). Axles 9 and 10 are conventionally fitted with respective traction wheels 9a, 9b and 10a, 10b. Propeller shafts 11, 12 are connected by respective universal joints 13, 14 to a power transfer device or transmission device 15 which, in innovative manner and as will be seen later on, acts as a go-between between an engine transmission 16 and the universal joints 13, 14 which, as seen, transmit motion to front axle 9 and rear axle 10 respectively.

As shown in FIG. 1, a longitudinal axis of symmetry B of the engine drive shaft 8a lies in a horizontal plane S2 substantially parallel to a plane S1 containing longitudinal axis of symmetry A. Both planes S1 and S2 are substantially parallel to, but at different levels with respect to the ground So. More specifically, plane S2 is higher than S1, so that, as intended, all the significant mechanical parts as regards transmission of motion between engine 8 and propeller shafts 11, 12 are located substantially above plane S1, thus greatly reducing the risk of seriously damaging engine 8, transmission device 15, and/or transmission 16, in the event, for example, of one of the front wheels 9a, 9b or the rear wheels 10a, 10b accidentally sinking into the terrain.

In the embodiment of the invention depicted in FIGS. 4–7, the transmission device 15 is located downstream from transmission 16 with respect to the transmission of motion from engine 8 to propeller shafts 11, 12. Together, the transmission device 15 and the transmission 16 define an innovative, transmission unit 100.

Figure 4:
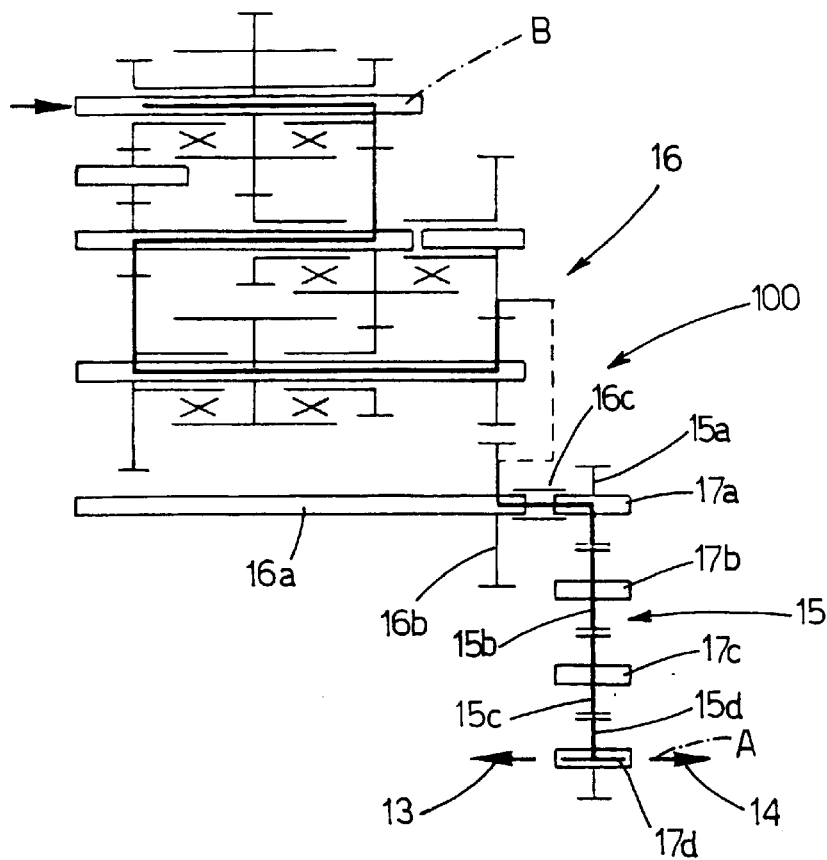
FIG. 4 schematically shows the gear train defining the engine transmission and the device for transmitting motion from the transmission to the two propeller shafts.
Figure 5:
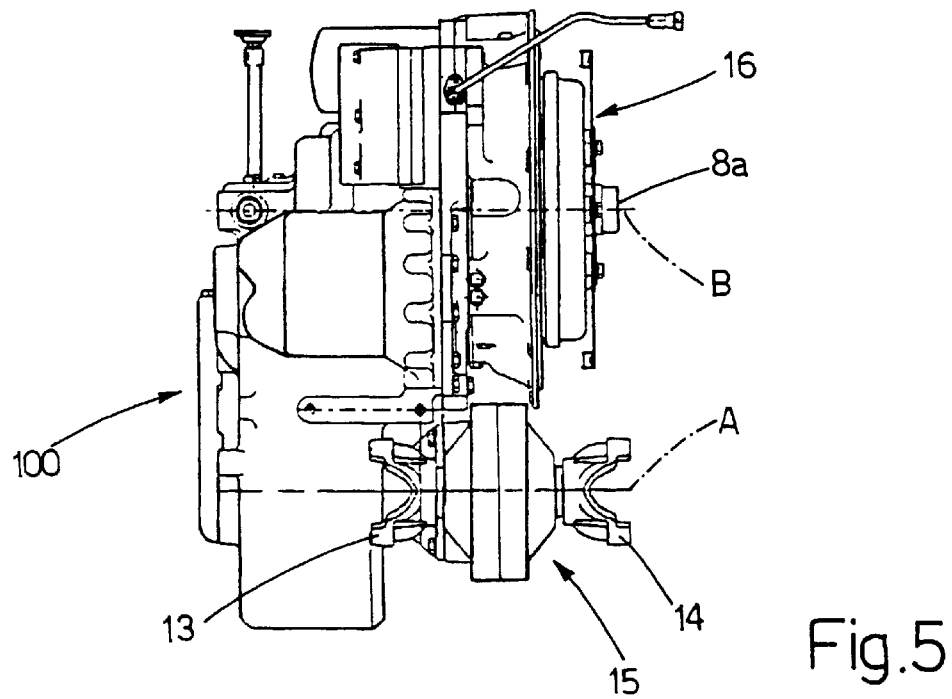
FIG. 5 shows a side view of the transmission device in the above drawings combined with the engine transmission.

As shown in FIG. 4, the transmission 16, which is mechanical, is defined conventionally by a number of gears which mesh selectively to obtain a number of different ratios as requested by the driver. In FIG. 4, the gears of the transmission 16 are shown meshing in first forward gear. The transmission 16 further is of a conventional design and therefore not described in detail.

As shown in FIG. 4, shaft 16a of the transmission 16 is fitted with the last gear 16b of the transmission 16, and transmits motion, via a joint 16c, to a shaft 17a fitted with the first gear 15a of the transmission device 15.

Figure 6:
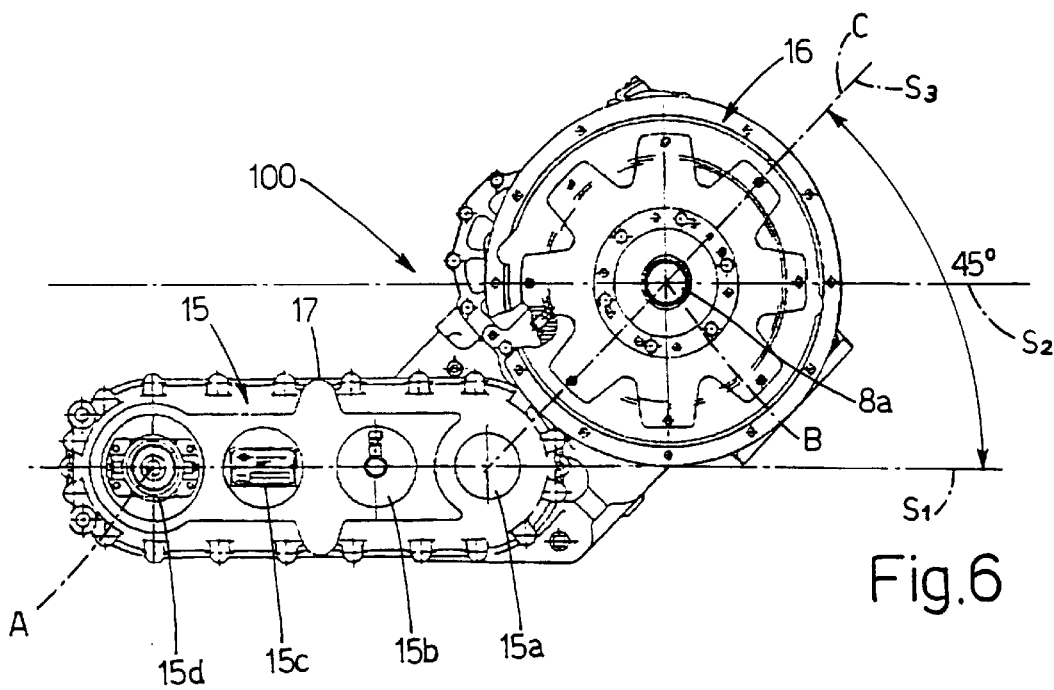
FIG. 6 shows a front view of the whole arrangement defined by the engine transmission and the transmission device.
Figure 7:
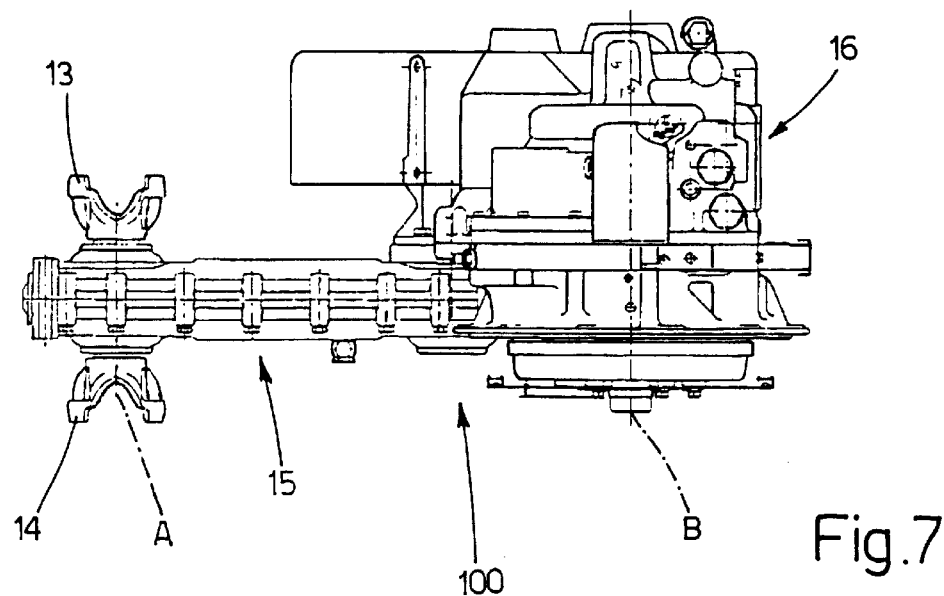
FIG. 7 shows a plan view of the transmission device and the engine transmission as shown in the above drawings.

As shown in FIGS. 4 and 6, device 15 comprises a casing 17 (FIG. 6) for supporting a number of shafts 17a–17d fitted with respective gears 15a–15d arranged in series and defining a gear train extending from the last gear 16b of the transmission 16 to the two universal joints 13, 14 integral with shaft 17d of the last gear 15d. By means of the universal joints 13, 14, motion is transmitted to the propeller shafts 11, 12 and then to the drive wheels 9a, 9b and 10a, 10b respectively. As best seen in FIG. 6, the shafts 17a–17d all extend in the previously defined plane S1.

As shown in FIG. 6, the transmission 16 of unit 100 has an axis of substantial symmetry C lying in a plane of substantial symmetry S3, which advantageously, though not necessarily, slopes at an angle of 45° with respect to parallel planes S1, S2, whereas device 15 extends substantially parallel to the horizontal plane S1. In other words, whereas device 15 extends substantially horizontally, the transmission 16 slopes at an angle of 45°.

The advantages of a device 15 and a unit 100 in accordance with the present invention will be clear from the foregoing description. Foremost is the advantage of eliminating, for example, the chains of known transmission systems, thus reducing the occurrence of vibrations and improving reliability of the system as a whole. Moreover, the shape of unit 100 provides for raising engine 8 with respect to ground So and lowering propeller shafts 11, 12 to conveniently transmit motion to wheels 9a, 9b and 10a, 10b. As such, the risk of collision between delicate elements such as the engine 8, the transmission unit 100, etc. with rough contours of the ground So, are greatly reduced.

The particular shape of unit 100 also provides for achieving the compactness and reliability essential to vehicle 1.

With particular reference to FIGS. 3 and 4, the transmission device 15 taps rotative power from the engine transmission 16 at shaft 16a, through which drive is transmitted in a rearward direction, i.e. opposite to the direction in which driving power enters the transmission 16 from the engine 8. Consequently, no extra space is required for the transmission device 15 on top of the engine transmission 16, reducing the overall length of the engine structure, whereby the spacing between the front and rear wheels 9a, 10a thus can be kept to a minimum, sufficient to house the combined engine/transmission structure.

Furthermore, as best seen in FIG. 6, the proper choice of the inclination of plane S3 and the dimension of the gears employed in the transmission 16 ensure that shaft 16a substantially coincides with plane S1, enabling the transmission device 15 to be oriented in a horizontal position. Due to the inclination of plane S3, the output of the transmission 16 is offset from the vertical, longitudinal plane through the engine 8 in the direction of the axis of symmetry A. As a result, the transmission device 15 is kept relatively short. Again by properly choosing the dimensions of the gears 15a–15d, the output shaft 17d, to which the universal joints 13, 14 are connected, substantially coincides with the axis of symmetry A. All of this results in a compact and simple, but nonetheless reliable transmission of power from the engine 8 towards the propeller shafts 11, 12.

Moreover, the particular shape of the transmission unit 100 provides for getting underneath the side member of the frame without having to disrupt the shape of said side member. This is extremely important in terms of construction by enabling the use of a frame comprising two identical, straight side members, one right and one left, requiring no recesses in the vehicle body. Automated production of the two side members is therefore simplified considering that they can be identical as regards their longitudinal sides.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a motor vehicle having a frame including longitudinal side members, a cab, a longitudinally positioned engine located laterally with respect to said cab, said engine having an output shaft, a transmission operatively connected to said output shaft of said engine, said transmission also having an output shaft, a telescopic lift arm which, in a front working position, is located between said cab and said engine, and front and rear axles receiving motive power from a pair of propeller shafts, the improvement comprising:

a power transfer device defined by at least four gears arranged in series and housed in a casing, said casing supporting shafts associated respectively with said gears, said power transfer device having a substantially rectilinear shape operatively connecting said transmission output shaft with said pair of propeller shafts, a first horizontal plane through a longitudinal axis of symmetry of said engine output shaft is located upwardly, with respect to the ground, of a second horizontal plane containing a longitudinal axis of symmetry through said axles and centrally through said power transfer device, said second horizontal plane being located below said longitudinal side member, a third plane extending through said engine output shaft and said transmission input shaft at a 45° angle to said second horizontal plane whereby said propeller shafts are located below said longitudinal side members and said engine, and said longitudinal side members are substantially identical as regards their longitudinal sides, and said transmission and said power transfer device are integral with each other and form a unit.

2. The motor vehicle of claim 1 wherein said output shaft of said power transfer device is connected to said propeller shafts through respective universal joints, said output shaft of said power transfer device substantially coinciding with said longitudinal axis of symmetry through said front and rear axles.

3. The motor vehicle of claim 2 wherein the power transfer device, as seen in the longitudinal direction of the vehicle, does not extend beyond the engine transmission.

* * * * *